United States Patent [19]

Gardner

[11] 3,719,337
[45] March 6, 1973

[54] FLIGHT CONTROL APPARATUS FOR MAINTAINING MAXIMUM GROUND SPEED WHILE WITHIN THE JET STREAM

[76] Inventor: Conrad O. Gardner, 11424 236th Pl. S.W., Edmonds, Wash. 98020

[22] Filed: June 14, 1971

[21] Appl. No.: 152,563

[52] U.S. Cl. ............... 244/77 D, 73/178 R, 73/182, 73/398 AR, 318/584
[51] Int. Cl. ............................................. B64c 15/00
[58] Field of Search ....73/178 R, 182, 196, 212, 386, 73/398 AR; 244/77 R, 77 A, 76 C; 318/481, 584, 645; 235/150.2

[56] References Cited

UNITED STATES PATENTS

| | | | |
|---|---|---|---|
| 2,962,243 | 11/1960 | Coleman et al. | 244/77 D |
| 3,548,662 | 12/1970 | Brandau et al. | 73/398 AR |
| 3,112,905 | 12/1963 | Greene | 244/77 D |
| 2,869,367 | 1/1959 | Moore | 73/182 |
| 3,052,831 | 9/1962 | Lewis et al. | 244/77 D X |
| 3,184,667 | 5/1965 | Kufert | 244/77 D X |
| 3,333,468 | 8/1967 | Jacobs | 73/212 UX |
| 2,664,254 | 12/1963 | Henrickson | 244/77 D |
| 3,160,013 | 12/1964 | Miller | 73/386 |
| 3,226,981 | 1/1966 | Mullins et al. | 244/77 D UX |
| 3,285,067 | 11/1966 | Greene | 73/178 R |

Primary Examiner—Milton Buchler
Assistant Examiner—Stephen G. Kunin
Attorney—Theron H. Nichols

[57] ABSTRACT

A system for maximizing ground speed utilizing jet stream air currents and/or providing guidance along the path of least resistance by processing of dynamic pressure information signals derived at spaced apart points of different altitude levels. Dynamic pressures are continuously compared and aircraft altitude control or altitude direction indicator means responsive to the compared pressures are utilized to cause changes in aircraft altitude or indicate the changes to be made to achieve maximum ground speed through a path of less resistance, or achieve increased comfort by avoiding paths adjacent large pressure differentials.

10 Claims, 4 Drawing Figures

INVENTOR
CONRAD O. GARDNER
BY
Theron H. Nichols
AGENT

INVENTOR,
CONRAD O. GARDNER
BY

*Theron H. Nichols*

AGENT

FLIGHT CONTROL APPARATUS FOR MAINTAINING MAXIMUM GROUND SPEED WHILE WITHIN THE JET STREAM

This invention relates to a system for detecting pressure differentials occurring between regions separated from the nose of an aircraft fuselage and the nose and processing signals representative of these pressure differentials to provide control signals for aircraft control or display instrument energization for pilot control.

The existence of the jet stream, its cross section and location is well known. Long distance jet flights usually cruise at altitudes between 30 and 40 thousand feet and jet streams are utilized or avoided as much as possible, depending upon whether the flight is easterly or westerly. Since the eye of the jet stream provides 100 to 150 nautical mile/hour air flow in an easterly direction in the northern hemisphere, the economic importance particularly over long range routes of flying precisely in the eye of the jet stream on west to east flights can readily be appreciated. A computer study of jumbo jet flight costs of a 5161-mile flight from San Francisco to Tokyo indicated costs of 2.48 cents per seat mile because fuel requirements reduce the possible number of passengers to 136, adverse jet stream winds adding to the fuel consumption on this east-to-west flight; west-to-east flight costs, however, drop to 1.11 cents per available seat mile (see Electronic News, Nov. 19, 1969, page 23).

Of further importance is the report in the literature that 80 percent of all turbulence encountered by jet liners between altitudes of 28,000 and 41,000 feet is associated with the jet streams, and since northern hemisphere jet streams with winds in the neighborhood of 125 knots, usually have cirrostratus or ice-crystal cloud formations on the lower south side and ice-crystal haze in other sections, the maximum wind shear and turbulence, other than the polar front turbulence, has been found to be in the proximity of the cirrostratus clouds. Thermal probes penetrate this area without giving significant temperature changes. As a result, this technique for detecting clear air turbulence (CAT) will not reliably provide correct indication in the vicinity of cirrostratus ice-crystal clouds. Temperature changes indicative of clear air turbulence occur over such a small distance that successful preparation for and/or avoidance of the maximum turbulence so soon after start of temperature change is difficult to realize. Other methods for advance detection and warning including radar, etc., are more exploratory than satisfactory.

As a consequence, since CAT (clear air turbulence) occurs mostly in the region of the jetstream in certain locations outside the precise eye as can be observed from published pictorial cross sections of the jetstream hereinbefore identified and hereinafter discussed and charted in a figure of the drawing, and since the jetstream core is localized vertically usually to within a few thousand feet, a change in flight path to the core in easterly flights thus becomes the best avoidance maneuver for CAT occurring outside the core and identification of maximum core (eye) windspeed location becomes of significant importance in CAT avoidance and at the same time maximum jetstream utilization to reduce fuel costs. In westerly flights, identification of points outside CAT regions can be determined from atmosphere cross section known or data taken and such flight paths taken to avoid CAT.

It is therefore an object of this invention to provide vertical search mode means for identifying the location of the path of least resistance for an aircraft flying in regions of different dynamic pressures displaced from the dynamic pressure of the flight path of the aircraft (as determined by the point of passage of the payload, e.g., the nose of the fuselage) and indicating to the pilot or causing the aircraft to fly such path of least resistance.

It is a further object of this invention to provide means for indicating to a pilot or automatically controlling the flight of an aircraft along a flight path which minimizes the occurrence of CAT and inherent danger to the cargo, passengers and aircraft structure.

It is yet another object of this invention to provide control signals derived from pressure comparisons for controlling the altitude of an aircraft to cause true ground speed to exceed air speed and be optimized in the region of the stream of resulting increased speed and fuel economy.

It is still another object of this invention to provide means for processing information signals from a plurality of dynamic pressure transducers transducers located in planes perpendicular to the direction of motion to provide air pressure signals for guiding an aircraft along a flight path in the region of the eye or maximum wind velocity of a jetstream to obtain a given ground speed at a lower fuel consumption rate than the rate obtainable in other regions outside the region of the eye of the jetstream.

It is yet a further object of this invention to provide dynamic pressure transducer means for deriving pressure differential type control signals for guiding an aircraft along a flight path of least resistance away from the eye of a jetstream or a turbulence area of high wind resistance when the aircraft flight path relative to the jetstream or turbulence results in increased wind resistance.

It is still another object of this invention to provide means for controlling the flight path in the direction of maximum windspeed currents at an altitude in the eye of the jetstream to avoid CAT outside the eye of the jetstream.

It is still a further object of this invention to determine the flight path resistance of an aircraft by pressure transducer means positioned at the nose of the fuselage and comparing the resistance at points in different directions away from the flight path to find a potential flight path of less resistance than the flight path of the aircraft, then causing the flight path of the aircraft to be changed in the direction of the potential flight path of less resistance to increase speed or conserve fuel and maintain the same ground speed or avoid resistance areas such as due to turbulence.

It is still another object to provide a simple and inexpensive guidance system for aircraft control to optimize performance by reducing fuel consumption and making maximum utilization of jetstream currents, thereby minimizing the use of expensive and sophisticated CAT detection instrumentation while operating at or near the eye of a jetstream or in other regions of varying resistances.

Accordingly an embodiment of the present invention a first airspeed sensing means positioned at the flight path of an aircraft (on the nose) is utilized to generate a reference signal and second and third airspeed sensing means facing forwardly are positioned above and below the flight path respectively to provide second and third signals representative of air flow energy above and below the aircraft respectively. The second sensing means is located at the top of the tail and the third sensing means is located on a projection forward from the bottom of the fuselage. The second and third sensing means are compensated for altitude separations from the reference sensor and are arranged away from or compensated for air disturbances generated by the aircraft structure itself and like reference sensor sense the dynamic pressure at these points. The second signal is compared with the reference signal in a voltage comparator circuit and when the pressure represented by the second signal is less than the pressure represented by the reference signal, a first control signal is generated having an amplitude indicative of the magnitude of the difference of these pressures. The first control signal is utilized to provide flight path control of the aircraft to higher altitude by adjustment of the elevator either by the human pilot or by the automatic pilot. The first control signal is either applied to a voltmeter as air indicator to the pilot or coupled to other utilization means including the autopilot comprising the elevator servo motors to cause elevator positioning for increasing aircraft altitude and climb toward higher altitude flight path. The increase in altitude to flight paths of lesser resistance may be continued by the pilot as long as the first control signal causes a voltmeter deflection from zero value thus until there is no flight path of lesser resistance indicated above the aircraft. The pilot may limit the extent of this maneuver, increasing altitude to any set limit, or may make the increase over a period of time until only a small indication remains on the meter after which automatic control may be made by coupling this control signal directly through to autopilot for up power through elevator servo motors and elevator. The third signal is compared with the reference signal in the voltage comparator circuit to provide a second control signal having an amplitude representative of the extent that the pressure below the fuselage nose is less than nose pressure. This second control signal is utilized by pilot or autopilot to cause however decrease in altitude of the aircraft to a flight path below the current flight path.

According to a further embodiment of this invention, a pair of laterally spaced apart pressure transducers are spaced apart from the reference transducer at the wing tips and indicate left and right directions to be taken or cause change of direction automatically when coupled to autopilot means. These four control signals representative of pressure ratios with respect to the nose reference pressure available in this further embodiment may be coupled to a cross pointer indicator type meter arrangement instead of four separate meters to indicate up or down, left or right action to be taken to the flight path of least resistance. These four control signals may alternately be utilized by other types of utilization means to indicate pressure trends as they change and be recorded and compared with favorable or unfavorable trends to predict and avoid undesirable flight paths or flight path regions in real time. Recording and comparison of this data represented by these control signals may be automatically by computer means or by stylus and pilot eye, for example.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which are illustrated and described certain preferred embodiments of the invention.

Figure 1:
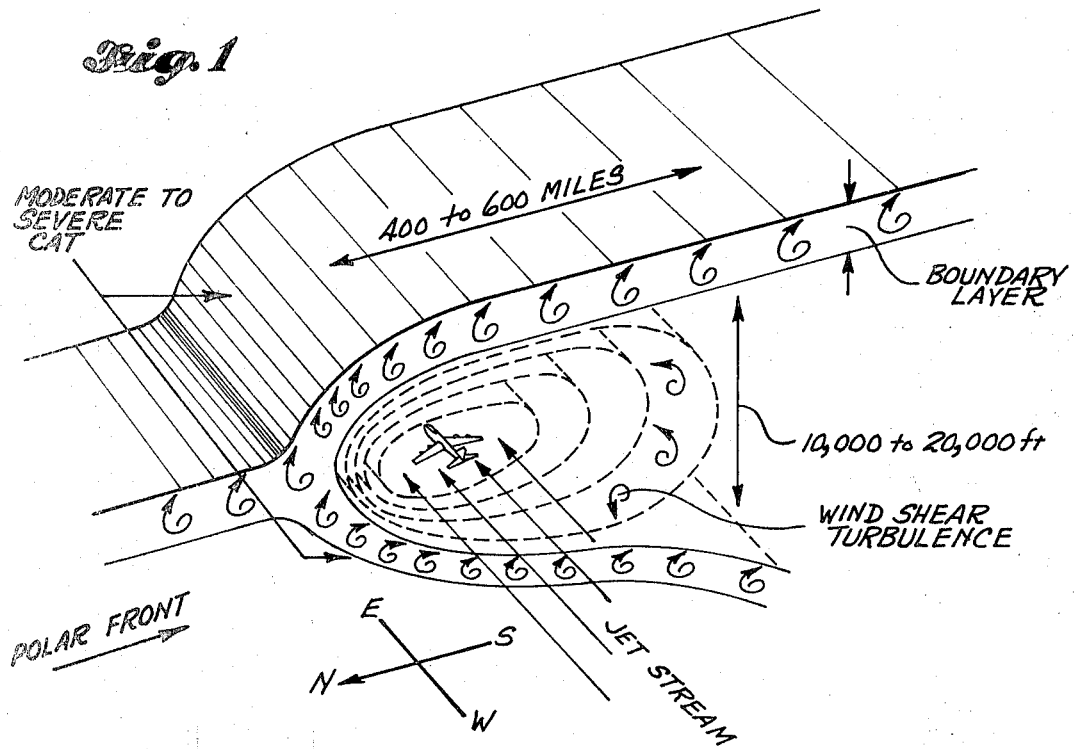
FIG. 1 is a pictorial cross-section of the jet stream in the northern hemisphere.

Turning now to FIG. 1 and a study of jet stream cross section, it will be first noted that the jet stream air flow depicted by the arrows so labelled comprise winds in the direction indicated of 100 to 150 nautical miles per hour. Upon careful study of the three-dimensional extent of various air flows depicted in FIG. 1, the observation can be made the certain turbulence areas may be avoided if precise positioning of the aircraft flight path can be made at the "eye" of the jet stream. The entire region of jet stream and associated winds including certain wind shear turbulence areas and moderate to severe CAT regions are shown as occurring between 10,000 and 20,000 feet with some change of altitude of the pattern of course occurring over various regions of the earth's surface. Pressure gradients towards the eye are thus seen to occur rather rapidly over small changes in altitude. Present jumbo jets and planned supersonic transports are large aircraft having the top of the tail section as much as 50 feet above ground permitting the extensive separation of pressure transducers at the nose and top of the tail section. With such separation now possible and noting the substantial pressure gradient with change in altitude in regions of the jet stream, the significance and an appreciation of the information present in the control signals of the present system will become appreciated. A precise display and/or fine control of aircraft and its flight path is realized in instances when substantial pressure gradients are present and paths of lesser resistance are detected based on small pressure changes which can be found and followed to increase ground speed and save fuel. This may be compared to the technique of pilot based changes of altitude made while observing changes in ground speed to hunt at least some of the jet stream current benefits.

Figure 2:
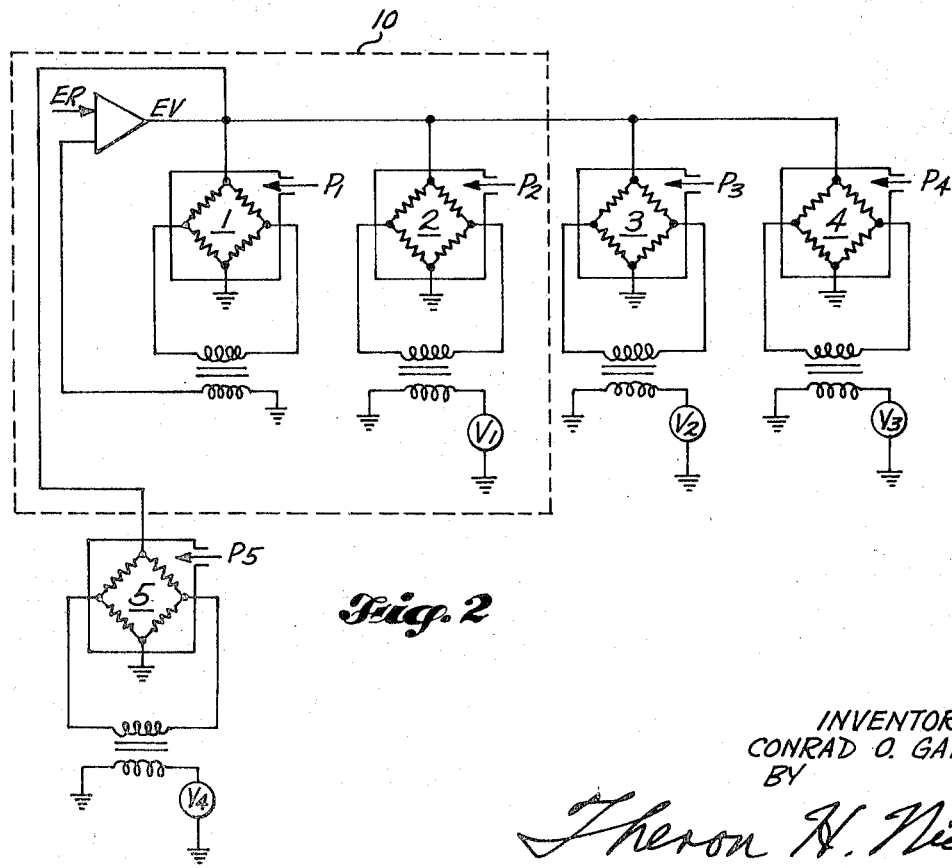
FIG. 2 is a detailed electrical circuit diagram of a flight path control apparatus according to one embodiment of the invention for measuring and comparing air flow energy relationships of potential flight path of an aircraft fuselage with respect to the resistance of the present flight path and fuselage positioning for lesser resistance flight path location of the aircraft.
Figure 4:
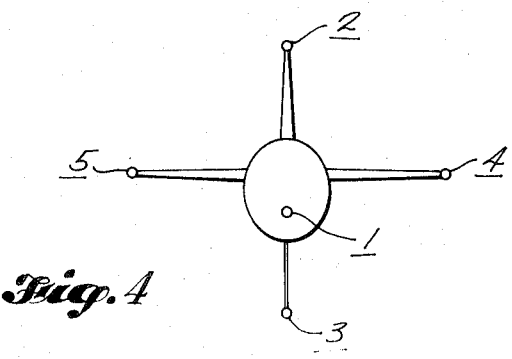
FIG. 4 shows locations of the pressure sensing means of the signal processing circuit of FIG. 2 with respect to the aircraft structure.

Referring now to FIG. 2, there is shown a pressure measurement system which provides an output $V_1$ corresponding to the ratio of pressures $P_1$ and $P_2$. Pressure sensors 1 and 2 are of the strain gauge type. The pressure ratio circuit 10 corresponds to the pressure ratio circuit shown in FIG. 1 of U. S. Pat. No. 3,548,662 to W. E. Brandau et al., which may be referred to for details of operation, and since utilizing strain gauge pressure sensors provides fast response and vibration immunity. The present pressure measurement system of FIG. 2 however differs from Brandau et al in that ratios of further pressures $P_1$ and $P_3$, $P_1$ and $P_4$, and $P_1$ and $P_5$ are made at $V_2$, $V_3$, and $V_4$, respectively, by the added strain gauges 3, 4, and 5 connected in circuits as strain gauge 2 back to the excitation voltage $E_V$. Only the single reference $E_R$ of the Landau type circuit is required to provide the series of pressure ratios $V_1$, $V_2$, $V_3$ and $V_4$ in the present system. The pressure $P_1$ is the air flow impinging on the nose of the aircraft detected by pressure sensor 1 which is located at the nose as shown in FIG. 4 and is utilized as the reference pressure in the flight path of the aircraft of FIG. 4. The pressure $P_2$ is the air flow impinging on the top of the tail section of the aircraft detected by pressure sensor 2 path is facing forward at the top of the tail section as shown in FIG. 4. The ratio of pressures $P_1$ and $P_2$ indicated by the voltage $V_1$ is indicative to the pilot looking at the voltage $V_1$ on the face of the voltmeter of whether the resistance (pressure $P_2$) is less at the altitude of sensor 2 a height of the tail above the nose and current flight path. If pressure $P_2$ is less than $P_1$ the aircraft may be straying away from the eye of the jet stream and reaching the outer limits of the jet stream. The pilot may actuate elevator and climb to position the aircraft deeper into the jet stream. Alternatively, the voltage $V_1$ may in such cause be supplied as a first control signal to the autopilot to energize up power through elevator servo motors to the elevators of the aircraft to cause automatic increase in altitude. Limits may be set on altitude while thus obtaining and following the path of least resistance if necessary by pilot action or causing the autopilot to be disengaged from actuation by the first control signal which is calling for and causing altitude increase beyond that desired or required by altitude limits or for other reasons. The pressure $P_3$ is the air flow impinging on the pressure sensor 3 mounted from and extending g forward below the fuselage as shown in FIG. 4. If further separation below nose pressure sensor 1 is desired, an aerodynamic vehicle or bird could be reeled out or lowered but would require a low drag and augmented weight to fly with good vertical separation below the aircraft with pressure sensor 3 oriented in a direction facing forward to sense the oncoming air flow. The ratio of pressures $P_1$ and $P_3$ (recalling that pressure $P_1$ is reference pressure at the nose of the fuselage) is indicated by the voltage $V_2$ which indicates to the pilot on this voltmeter whether a of lower altitude and less pressure and resistance exists. Direct pilot action may be taken as in the case of $V_1$, however, to decrease altitude or autopilot action may be taken by utilizing $V_2$ as a second control signal calling for down power through the elevator servomotors to cause a decrease in altitude until an altitude is reached where the $V_2$ control signal voltage no longer represents a ratio indicating a lesser pressure $P_3$ at sensor 3 than pressure $P_1$ at nose sensor 1. The pressure $P_4$ is the air flow impinging on forward facing pressure sensor 4 mounted on the left wing tip as shown in FIG. 4.

The ratio of pressures $P_1$ (nose pressure) and $P_4$ is provided as voltage $V_3$ on the voltmeter and indicates to the pilot a fly left command if the ratio is such that $P_4$ is the lesser pressure. After sufficient fly left by the pilot the ratio upon approaching a 1 to 1 ratio will indicate that all the corrective action that is obtainable has been utilized. This voltage $V_3$ may be utilized as a third control signal to the autopilot to make the same maneuver. When there is reappearance of the third control signal, correction of flight path by fly left is continuously made until the 1 to 1 ratio is approached indicative of no further information available for further correction of flight path. Fly right information is derived by the ratio of pressures $P_1$ and $P_5$ appearing as voltage $V_4$ on corresponding voltmeter of the circuit of FIG. 2. This voltage $V_4$ indicates a fly right command if the ratio is such that $P_5$ is the lesser pressure. After sufficient fly right action by the pilot, a 1 to 1 ratio is achieved. This voltage $V_4$ may be utilized as a fourth control signal in utilization means comprising the autopilot instead of displayed on the voltmeter if automatic corrective action is preferred. Instead of the first, second, third, and fourth control signal voltages being displayed n separate voltmeters these signal voltages may be utilized to energize fly up, fly down, fly left and fly right lamps respectively when the ratios exceed a predetermined value, for example. These control signal voltages may be transmitted to other utilization means such as a four channel recorder, or stored and compared by computer means. Further utilization means may comprise for example an alarm light energized when one or more pressure ratio voltages exceed a given value indicating that a substantial difference exists with respect to the pressure nose on so that slight change in flight path may cause great increase in resistance. Such an alarm could indicate a warning before further large pressure ratio differences adjacent the flight path are reached resulting in possible sudden change in resistance or turbulence.

Figure 3:
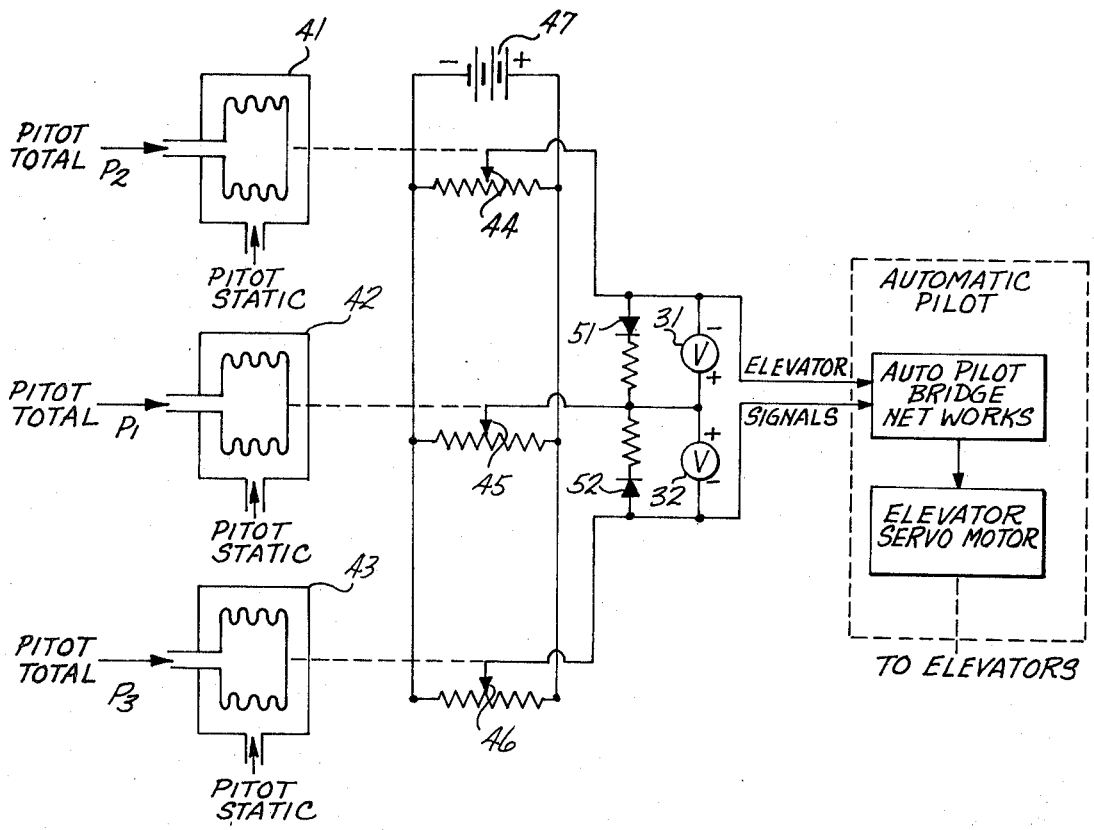
FIG. 3 is a detailed electrical circuit diagram of a flight path control apparatus according to a further embodiment of the invention for aiding in obtaining a flight path having desired characteristics.

The circuit of FIG. 3 shows the circuit diagram partially in block of a system for processing the information from the pressures $P_1$, $P_2$ and $P_3$ where the pressure transducers are Pitot tube type air speed type devices which require compensation for change in altitude or temperature and altitude separation due to separation vertically on the aircraft with respect to the flight path. Voltmeters 31 and 32 display first and second control signals whose amplitudes are representative of direct pressure differences of $P_2$ and $P_3$ with respect to the reference pressure $P_1$ at the nose instead of pressure ratios as in the embodiment of FIG. 2. Automatic pilot utilization means here is shown coupled to receive the elevator signals comprising the first and second control signals represented by voltages on the respective voltmeters 31 and 32. Potentiometer wiper 45 is connected by a mechanical link to the bellows wall of Pitot tube 42 so that its position and therefore the value of voltage picked off by it will be a function of dynamic indicated air speed at the nose of the aircraft. The bellows wall of forwardly facing Pitot tube 41 at the top of the tail section is coupled by a mechanical linkage to potentiometer wiper 44 so that its position and therefore the value of voltage picked off by it will be a function of dynamic indicated air speed at the top of the tail section of the aircraft. When the voltage picked off by wiper 44 represents a lesser pressure $P_2$ with respect to $P_1$, a voltage will appear at voltmeter 31 and the amount of deflection will depend upon the extent of this pressure difference. Diode 51 shunts current and prevents voltmeter 31 deflection when pressure $P_2$ is greater and causes a voltage to be picked off by wiper 44 of opposite polarity. The bellows wall of forwardly facing Pitot tube 43 below the aircraft fuselage is coupled by mechanical linkage to potentiometer wiper 46 so that its position and therefore the value of voltage picked off by it will be a function of dynamic indicated air speed below the fuselage. When the voltage picked off by wiper 46 represents a lesser pressure $P_3$ with respect to $P_1$ a voltage whose amplitude is representative of the magnitude of the difference will be indicated on voltmeter 32. Diode 52 serves to shunt voltages of opposite polarity from driving voltmeter 32 off scale when pressure $P_3$ is greater than reference pressure $P_1$. The first control voltage 31 may be coupled to up power means through the automatic pilot if pilot action through observance of meter display at voltmeter 31 is not desired. The second control voltage 32 may be coupled as shown for automatic pilot decrease in altitude. In other elevator control systems up control voltage signal 31 and down control voltage signal 32 may be utilized such as in direct servo control systems other than autopilot (as shown in FIG. 3) as represented, for example, by U. S. Pat. No. 3,052,831 to Lewis et al. where in FIG. 1 the present first and second control signals may be coupled respectively to up power circuit 52 and down power circuit 54 instead of utilizing the altitude control signals from discriminator 50.

While the present invention has been described in different embodiments with various numbers and locations of air pressure transducers to determine dynamic air pressure values of potential flight paths surrounding the actual flight path which have compared to that dynamic pressure of the reference flight path (e.g., as measured at the nose), it should be recognized that different numbers and locations of transducers permit different determinations of the cross section of air flow surrounding the fuselage and may be varied depending upon the particular type of information desired and the type of action planned e.g., zeroing in on the eye of the jet stream in easterly flights). The present systems provide a pilot the quality of nearby potential flight paths in different directions from the current flight path without actual maneuver to discover for example how these would affect true ground speed. Also, dangerous resistances developing above or below, etc., the flight path are indicated before large differentials develop wherein slight variations in flight path could result then in turbulence (severe resistance variations). Further uses for the information developed by the present system control signals will now become obvious to those skilled in the art, the previous utilization means including display and path control being exemplary and not limiting.

What I claim is:

1. The method of controlling the flight path of an aircraft comprising the steps of:
    measuring the air speed of the aircraft at a point adjacent the longitudinal axis of said aircraft;
    measuring the airspeed at a further point separated vertically on the aircraft with respect to the flight path of the aircraft and spaced a further predetermined distance from said point and on an axis parallel to said longitudinal axis;
    selecting the lesser of said air speeds measured; and maneuvering said aircraft along a flight path in the region of said lesser of said air speeds measured.

2. An aircraft indicator or control system comprising: first and second pressure sensing means positioned respectively above and below the wing of an aircraft structure for generating first and second signal voltages representative of the pressures above and below the wing respectively of said aircraft structure, means for comparing said first and second signals representative of said pressures above and below the wing respectively and providing control signals indicative of the pressures compared, and utilization means responsive to said control signals.

3. The system of claim 2, wherein said utilization means comprises autopilot means.

4. The system of claim 2, wherein said means for comparing pressures comprises pressure ratio circuit means.

5. The system of claim 2, wherein said means for comparing pressures comprises pressure difference circuit means.

6. Method of deriving guidance signal information for control of an aircraft during flight comprising the steps of:
    sensing dynamic pressures at a plurality of first points along a plane through a first axis passing through the longitudinal axis of the aircraft fuselage and at a plurality of second points along a plane through a second axis passing through the longitudinal axis of the fuselage, said second axis being perpendicular to said first axis;
    processing signals representative of said sensed dynamic pressures at said first and second points to provide guidance signal information control signals for said aircraft.

7. In an aircraft having a fuselage and a tail section, a system for comparing pressures of at least first and second flight paths and comparing said pressures to furnish a control signal representative of the flight path of least resistance of said at least first and second flight paths for coupling to utilization means comprising:
    first pressure sensing means arranged in said first flight path and responsive to air speed of said first flight path to provide a first output signal voltage representative of said air speed of said first flight path;
    second pressure sensing means arranged in said second flight path and responsive to air speed of said second flight path to provide a second output signal voltage representative of said air speed of said second flight path;
    means responsive to said first and second output signal voltages for providing a first control signal voltage which is a function of said first and second output signal voltages;
    first utilization means responsive to said first control signal voltage;
    said first pressure sensing means arranged on the nose of the fuselage of said aircraft, said second pressure sensing means arranged at the top of said tail section of said aircraft and further comprising:

third pressure sensing means arranged below the nose of the fuselage of said aircraft for providing a third output signal voltage representative of air speed below the nose of the fuselage;

means responsive to said first and third output signal voltages for providing a second control signal voltage which is a function of said first and third output signal voltages; and second utilization means responsive to said control signal voltage.

8. The combination of claim 7 wherein said first and second utilization means comprise first and second voltmeters respectively.

9. The combination of claim 7 further comprising:

fourth pressure sensing means arranged on the left wing tip of said aircraft for providing a fourth output signal voltage representative of air pressure on the left wing tip of said aircraft;

means responsive to said first and fourth output signal voltages for providing a third control signal voltage which is a function of said first and fourth output signal voltages;

third utilization means responsive to said third control voltage;

fifth pressure sensing means arranged on the right wing tip of said aircraft for providing a fifth output signal voltage representative of air pressure on the right wing tip of said aircraft;

means responsive to said first and fifth output signal voltages for providing a fourth control signal voltage which is a function of said first and fifth output signal voltages; and fourth utilization means responsive to said fourth control signal voltage.

10. An aircraft altitude control system comprising:

first and second dynamic air pressure sensing means mounted on said aircraft and positioned in spaced apart horizontal planes, and aircraft altitude control means responsive to said first and second dynamic air pressure sensing means for causing the aircraft to ascend and descend, only in the direction of the lower sensed dynamic air pressure for flying in the air of least resistance.

* * * * *